United States Patent
Yoakum et al.

(10) Patent No.: US 9,912,814 B2
(45) Date of Patent: Mar. 6, 2018

(54) INTEGRATING BUSINESS PERFORMANCE ACTIVITY WITH PERSONAL PERFORMANCE ACTIVITY ON A WEARABLE DEVICE

(71) Applicant: Avaya Inc., Santa Clara, CA (US)

(72) Inventors: John H. Yoakum, Cary, NC (US); Tony McCormack, Galway (IE)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/751,988

(22) Filed: Jun. 26, 2015

(65) Prior Publication Data
US 2016/0381221 A1  Dec. 29, 2016

(51) Int. Cl.
H04M 3/00 (2006.01)
H04M 3/51 (2006.01)
G06Q 10/06 (2012.01)
G08B 5/36 (2006.01)

(52) U.S. Cl.
CPC .... H04M 3/5175 (2013.01); G06Q 10/06398 (2013.01); G08B 5/36 (2013.01)

(58) Field of Classification Search
CPC ................. H04M 3/5175; H04M 2203/401
USPC ........................................ 379/265.06, 265.03
See application file for complete search history.

(56) References Cited

U.S. PATENT DOCUMENTS

| | | | |
|---|---|---|---|
| 9,392,974 B2* | 7/2016 | Engelbrecht | A61B 5/7207 |
| 2003/0220835 A1* | 11/2003 | Barnes, Jr. | G06Q 10/1053 705/14.36 |
| 2015/0195405 A1* | 7/2015 | McCormack | H04M 3/5175 379/265.06 |
| 2015/0220883 A1* | 8/2015 | B'far | G06Q 10/105 700/91 |

* cited by examiner

Primary Examiner — Rasha Al Aubaidi
(74) Attorney, Agent, or Firm — Sheridan Ross P.C.

(57) ABSTRACT

A wearable computing device. The wearable computing device includes a wireless communications interface and a processor device coupled to the wireless communications interface. The processor device is configured to monitor a personal performance activity of a wearer of the wearable computing device. The processor device is further configured to receive, via the wireless communications interface, a business performance metric alert that indicates that a business performance metric quantifier that quantifies a business performance metric of an individual is an undesirable value. The processor device is further configured to signal a wearer of the wearable computing device that the wearable computing device has received the business performance metric alert.

20 Claims, 7 Drawing Sheets

INTEGRATING BUSINESS PERFORMANCE ACTIVITY WITH PERSONAL PERFORMANCE ACTIVITY ON A WEARABLE DEVICE

TECHNICAL FIELD

The embodiments relate to the integration of business performance activity with personal performance activity on a wearable device.

BACKGROUND

Wearable devices that provide information about daily activities and other user-focused information are popular. Such devices are increasingly designed with a focus not only on functionality but also aesthetics. Consequently, individuals often wear such devices throughout the day, including during work hours, rather than just during periods of exercise.

Many employees are judged based on business performance metrics associated with their respective employment role. Such business performance metrics may be continually measured and quantified during the employee's work day. For example, in the context of a contact center, a contact center agent may be continuously monitored on a number of business performance metrics, such as answered calls count, a wait time for incoming callers, customer satisfaction, and the like. A supervisor may be presented real-time information regarding the contact center agent's business performance metrics on a monitor and use such information as the basis for training, load-balancing, performance reviews, and the like.

SUMMARY

The embodiments relate to the integration of business performance metrics of an individual while performing a business function with a wearer's personal wearable device used to track and monitor personal performance activity metrics of the wearer.

In one embodiment a wearable computing device is provided. The wearable computing device includes a wireless communications interface and a processor device coupled to the wireless communications interface. The processor device is configured to monitor a personal performance activity of a wearer of the wearable computing device. The processor device is further configured to receive, via the wireless communications interface, a business performance metric alert that indicates that a business performance metric quantifier that quantifies a business performance metric of an individual is an undesirable value. The processor device is further configured to signal a wearer of the wearable computing device that the wearable computing device has received the business performance metric alert.

In one embodiment the wearable computing device includes a display, and the processor device is further configured to provide a first visual depiction on the display that quantifies the personal performance activity of the wearer.

In one embodiment the personal performance activity of the wearer is one of a heart rate, a blood pressure, and an aggregate number of steps taken over a period of time.

In one embodiment the processor device is further configured to provide a second visual depiction on the display that identifies the business performance metric alert.

In one embodiment the wearable computing device comprises a light-generating device, and the processor device is further configured to initiate activation of the light-generating device to signal the wearer that the wearable computing device has received the business performance metric alert.

In one embodiment the wearable computing device comprises a wrist strap, and the wrist strap is configured to fix the wearable computing device with respect to a wrist of the wearer.

In one embodiment the wearable computing device comprises a display, and the processor device is further configured to present, on the display, the business performance metric quantifier.

In one embodiment the business performance metric comprises an answered calls count performance metric, a wait time for incoming callers performance metric, an abandoned call count performance metric, a revenue per agent performance metric, a customer satisfaction performance metric, and a first call resolution per service performance metric.

In another embodiment a system is provided. The system includes a wireless computing device that includes a first wireless communications interface configured to communicate with a network and a first processor device coupled to the first wireless communications interface. The first processor device is configured to receive a business performance metric quantifier that quantifies a business performance metric of an individual. The first processor device is also configured to determine that the business performance metric quantifier is an undesirable value. The first processor device is also configured to generate a business performance metric alert and communicate the business performance metric alert to a wearable computing device via the first wireless communications interface. The system also includes the wearable computing device that includes a second wireless communications interface configured to communicate with the network. The wearable computing device also includes a second processor device configured to monitor a personal performance activity of a wearer of the wearable computing device, receive, via the second wireless communications interface, the business performance metric alert, and signal a wearer of the wearable computing device that the wearable computing device has received the business performance metric alert.

In one embodiment a method for signaling a wearer of a wearable computing device is provided. The method includes monitoring, by a wearable computing device comprising a processor device, a personal performance activity of the wearer; receiving, via a wireless communications interface, a business performance metric alert that indicates that a business performance metric quantifier that quantifies a business performance metric of an individual is an undesirable value; and signaling the wearer that the wearable computing device has received the business performance metric alert.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first processor device" and "second processor device," and does not imply a priority, a type, an importance, or other attribute, unless otherwise stated herein. The term "about" used herein in conjunction with a numeric value means any value that is within a range of ten percent greater than or ten percent less than the numeric value.

The phrase "business activity performance metric" as used herein is a particular business activity of an employee that can be quantified in some manner. By way of non-limiting example, in the contact center context, business activity performance metrics may include how many calls an agent has answered over a predetermined period of time, how many calls an agent has handled successfully over a predetermined period of time, how many calls the agent has failed to attend to successfully, how much time the agent spends per call, a wait time for incoming callers, an abandoned call count, a revenue per agent metric, a customer satisfaction metric, and a first call resolution per service metric.

The phrase "business activity performance quantifiers" as used herein refers to data that quantifies a business activity performance metric.

The phrase "personal performance activity" as used herein refers to an activity or characteristic that relates to the physical and/or personal health of a wearer of a wearable computing device. By way of non-limiting example, a personal performance activity may be a heart rate, a blood pressure, a body temperature, an amount of sleep within an earlier period of time, a number of steps walked over a period of time, and the like.

The embodiments relate to the integration of business performance metrics of an individual while performing a business function as an employee with a wearer's personal wearable device used to track and monitor personal performance activity metrics of the wearer. In some embodiments, the individual performing the business function and the wearer of the personal wearable device are the same person. In other embodiments, the wearer of the personal wearable device may be different from the individual performing the business function. For example, the wearer of the personal wearable device may be a supervisor of the individual performing the business function.

Figure 1:
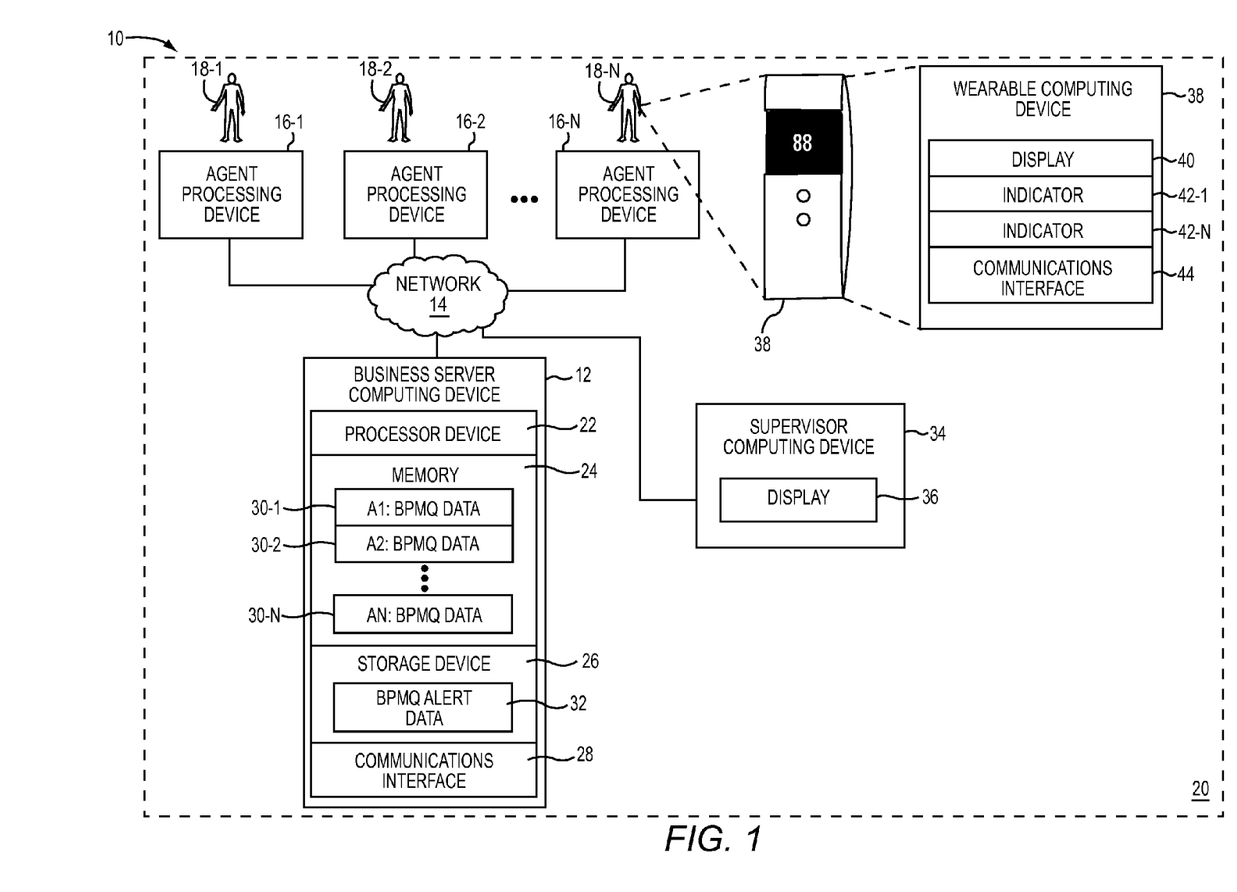
FIG. 1 is a block diagram of a system in which embodiments may be practiced.

In this regard, FIG. 1 is a block diagram of a system 10 in which embodiments may be practiced. The system 10 includes a business server computing device (BSCD) 12 that is coupled to a network 14, and a plurality of agent processing devices 16-1-16-N (generally, agent processing devices 16). A plurality of individuals 18-1-18-N (generally, individuals 18), sometimes referred to as users, utilize the corresponding agent processing devices 16 in the performance of their respective job functions. The individuals 18 may be physically co-located with one another or may be remote from one another. While for purposes of illustration the embodiments will be discussed in the context of a contact center 20, which is a business that operates to provide customer support to callers, the embodiments have applicability to any job functions wherein the performance of an individual 18 can be monitored and quantified.

The BSCD 12 includes a processor device 22, such as a commercially available or proprietary processor or microprocessor. The BSCD 12 also includes a memory 24 that is coupled to the processor device 22. A storage device 26, such as a hard drive or solid state drive may store data such as software instructions, which, when executed on the processor device 22, implement some or all of the functionality described herein with regard to the BSCD 12. The BSCD 12 may communicate with the network 14 and with other devices via one or more communications interfaces 28.

In this example, the agent processing devices 16 may comprise computing devices via which the individuals 18 receive contacts from customers and provide support to such customers. The agent processing devices 16 may provide information regarding the business performance of the individuals 18 to the BSCD 12 continually, intermittently, periodically, or upon request. Such information may comprise, or may be used by the BSCD 12 to generate, business performance metric quantifiers that quantify various business performance metrics associated with the individuals 18. By way of non-limiting example, in the context of a contact center, the business performance metrics may comprise an answered calls count performance metric, a wait time for incoming callers performance metric, an abandoned call count performance metric, a revenue per agent performance metric, a customer satisfaction performance metric, and a first call resolution per service performance metric.

In one embodiment, the BSCD 12 stores in the memory 24 business performance metric quantifier data 30-1-30-N (generally, business performance metric quantifier data 30) for each corresponding individual 18. The BSCD 12 may intermittently or periodically analyze the business performance metric quantifier data 30 against business performance metric quantifier alert data 32 that identifies desired business performance metric quantifier values or ranges. If the BSCD 12 determines that the business performance metric quantifier data 30 is outside of desired values or ranges, the BSCD 12 may generate an alert, and provide the alert, for example, to a supervisor computing device 34 for presentation on a display 36.

In one embodiment, the individual 18-N wears a wearable computing device 38. The wearable computing device 38 may be coupled to the body of the individual 18-N, worn around the neck or other body part of the individual 18-N, carried in a pocket of the individual 18-N, or the like. Solely for purposes of illustration, the wearable computing device 38 is illustrated as having a wrist strap that is configured to fix the wearable computing device 38 to a wrist of the individual 18-N. The wearable computing device 38 includes, in this example, a display 40 on which information may be presented. The wearable computing device 38 monitors a personal performance activity of the individual 18-N that is independent of any business performance metrics measured by the employer of the individual 18-N. By way of non-limiting example, the wearable computing device 38 may monitor the heart rate, blood pressure, body temperature, amount of sleep within an earlier period of time, number of steps walked over a period of time by the individual 18-N, and the like. The wearable computing device 38 may also include one or more indicators 42-1, 42-N (generally, indicators 42), such as, for example, light-emitting diodes or other light-generating devices, that may be selectively activated or deactivated by the wearable computing device 38. The wearable computing device 38 also includes a communications interface 44 that facilitates communications with other devices directly and/or via the network 14.

The wearable computing device 38 is wirelessly communicatively coupled to the BSCD 12 via a personal area network (PAN) utilizing Bluetooth, Zigbee, or other PAN protocol or via another wireless technology, such as WiFi, through, for example, the network 14. In some embodiments, the individual 18-N may first need to complete a registration process wherein the individual 18-N provides certain information regarding the wearable computing device 38 to an operator of the BSCD 12. The registration process may ensure that only employees of the contact center 20 are capable of receiving the functionality described herein. The registration process also associates the wearable computing device 38 with the particular individual 18-N.

Figure 2:
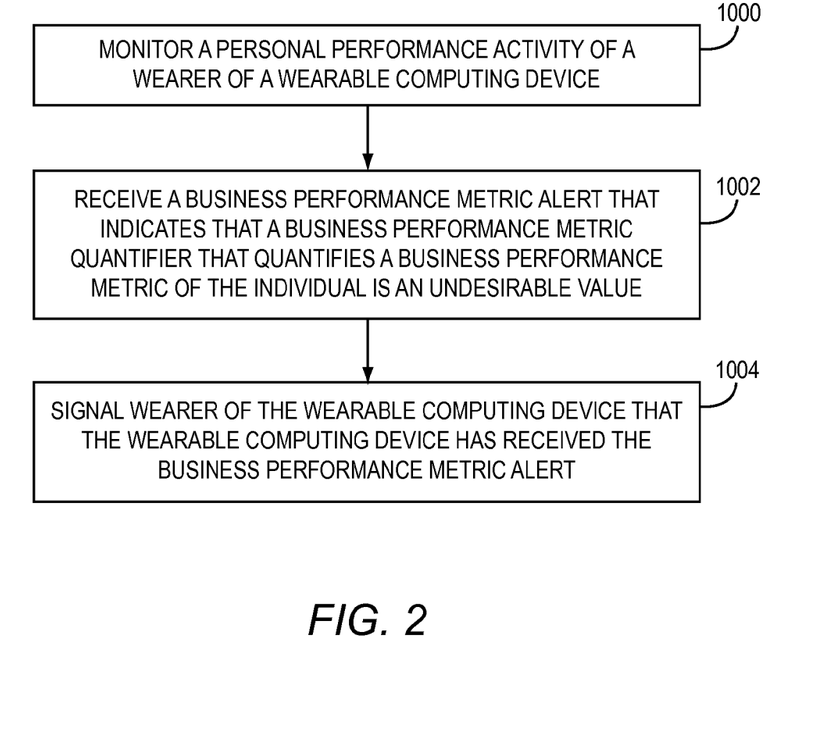
FIG. 2 is a flowchart of a method according to one embodiment.

FIG. 2 is a flowchart of a method according to one embodiment and will be discussed in conjunction with FIG. 1. The wearable computing device 38 continuously monitors a personal performance activity of a wearer of the wearable computing device 38 (FIG. 2, block 1000). As discussed above, the BSCD 12 may substantially concurrently periodically, intermittently, or continuously analyze the business performance metric quantifier data 30-N, which corresponds to the individual 18-N, to detect whether business performance metric quantifiers are outside of desirable ranges. If the BSCD 12 determines that the business performance metric quantifier data 30-N is outside of a desirable value, or range, the BSCD 12 generates a business performance metric alert that indicates that a business performance metric quantifier is an undesirable value, and sends the business performance metric alert to the wearable computing device 38.

The wearable computing device 38 receives the business performance metric alert (FIG. 2, block 1002). The wearable computing device 38 signals a wearer of the wearable computing device 38 that the wearable computing device 38 has received the business performance metric alert (FIG. 2, block 1004). The signal may comprise any desired audible, visible, or tactile, such as vibrational, output. For example, the wearable computing device 38 may provide a visual depiction, such as by activating one or both of the indicators 42. The particular signal may differ depending on the particular business performance metric to which the business performance metric alert pertains. For example, activation of the indicator 42-1 may be configured to mean that an answered calls count business metric quantifier is an undesired value. In other words, the BSCD 12, based on information provided by the agent processing device 16-N, has determined that the individual 18-N is not answering a sufficient number of calls over some predetermined period of time. While for purposes of illustration the embodiments are described herein in the context of the individual 18-N being both the person whose business performance is being monitored and the wearer of the wearable computing device 38, the embodiments are not so limited. In other embodiments, the wearer of the wearable computing device 38 may be a different person from the person whose business performance is being monitored. By way of non-limiting example, the wearer of the wearable computing device 38 may be a supervisor of the individual 18-N who is signaled when a business performance metric quantifier of the individual 18-N is an undesirable value. Moreover, the business performance metric alert may be based on one or more business performance metric quantifiers that relate to multiple individuals 18-N. For example, in the example of a supervisor being the wearer of the wearable computing device 38, the business performance metric alert may be based on an aggregate of multiple business performance metric quantifiers associated with a number of individuals 18-N.

Activation of the indicator 42-N may be configured to mean that a wait time for incoming callers business metric is an undesired value. In other words, the BSCD 12, based on information provided by the agent processing device 16-N, has determined that callers assigned to the individual 18-N are waiting too long.

It should be noted that although the wearable computing device 38 receives information from the BSCD 12, such as a business performance metric alert, the wearable computing device 38 does not provide personal performance activity information to the BSCD 12.

Figure 3:
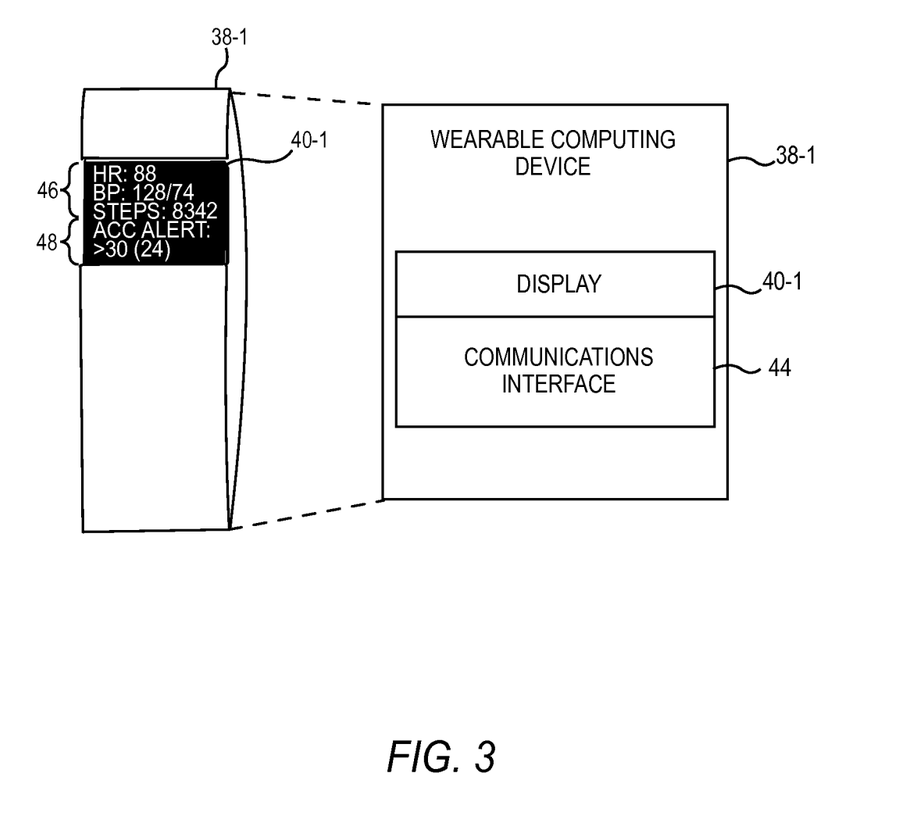
FIG. 3 is a block diagram of a wearable computing device according to one embodiment.

FIG. 3 is a block diagram of a wearable computing device 38-1 according to another embodiment. In this embodiment, the wearable computing device 38-1 includes a display 40-1 capable of displaying multiple pieces of information concurrently. In particular, the display 40-1 may provide a first visual depiction 46 that quantifies personal performance activities of the individual 18-N, such as, in this example, a heart rate ("HR"), a blood pressure ("BP"), and a number of steps taken by the individual 18-N over the course of the day. The display 40-1 may also provide a second visual depiction 48 that identifies a business performance metric alert. In this example, the business performance metric alert pertains to an answered calls count ("ACC").

Figure 4:
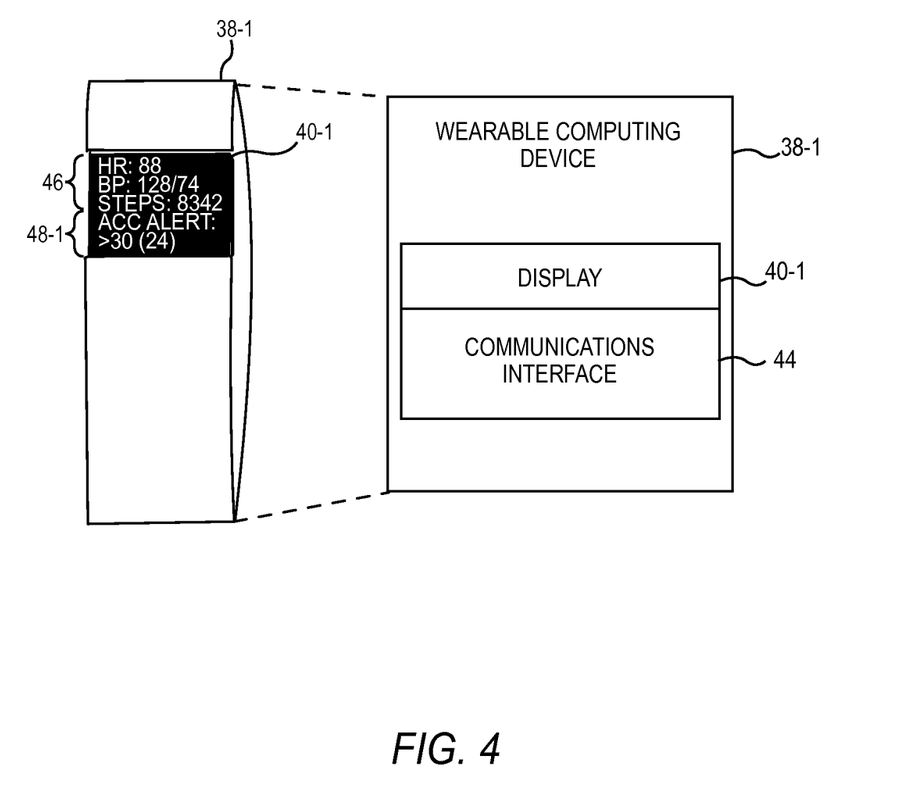
FIG. 4 is a block diagram of the wearable computing device illustrated in FIG. 3 according to another embodiment.

FIG. 4 is a block diagram of the wearable computing device 38-1 illustrated in FIG. 3 according to another embodiment. In this embodiment, the wearable computing device 38-1 includes the display 40-1 and provides the first visual depiction 46 that quantifies personal performance activities of the individual 18-N, such as, in this example, a heart rate ("HR"), a blood pressure ("BP"), and a number of steps taken by the individual 18-N over the course of the day. The display 40-1 may also provide a second visual depiction 48-1 that not only identifies a business performance metric alert but also presents the desired business performance metric and the undesirable business performance metric quantifier of the individual 18-N. In this example, the second visual depiction 48-1 indicates that the desired answered calls count is more than 30 calls, and that the individual 18-N has answered only 24 calls. In this example, the business performance metric alert pertains to an answered calls count ("ACC").

Figure 5:
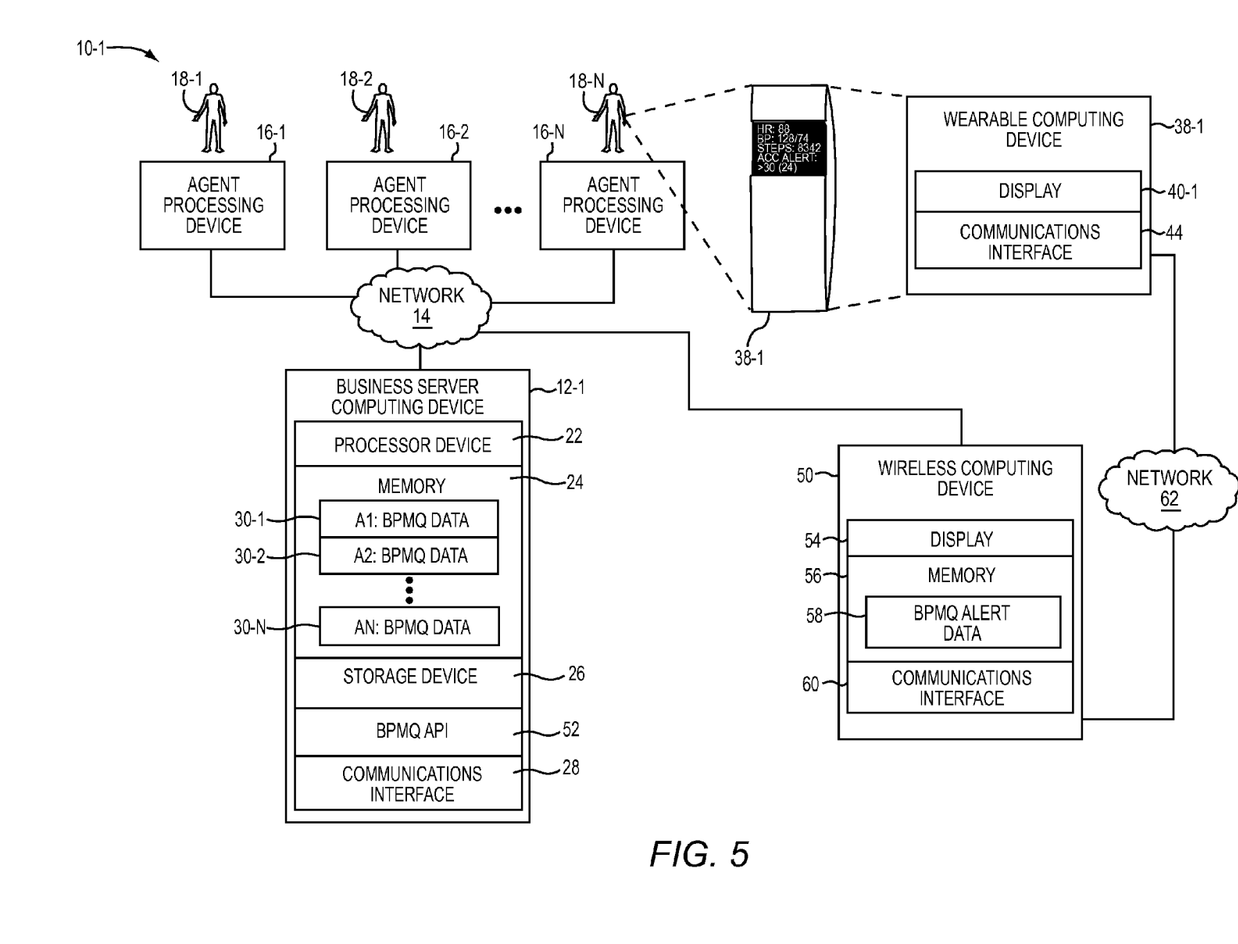
FIG. 5 is a block diagram of a system in which additional embodiments may be practiced.

FIG. 5 is a block diagram of a system 10-1 in which additional embodiments can be practiced. The system 10-1 is substantially similar to the system 10 discussed above with regard to FIG. 1, except as otherwise discussed herein. In this embodiment, the system 10-1 includes a wireless computing device 50, such as a smartphone, computing tablet, or the like. The wireless computing device 50 communicates with the BSCD 12-1 via, for example, a business performance metric quantifier application programming interface (API) 52, which exposes certain functions to the wireless computing device 50. For example, the wireless computing device 50 may periodically or intermittently invoke the business performance metric quantifier API 52 to receive updated business performance metric quantifier data 30-N associated with the individual 18-N. Alternatively, rather than the business performance metric quantifier API 52, the BSCD 12-1 may provide the business performance metric quantifier data 30-N to the wireless computing device 50 via a data feed or via any other information communication mechanism.

The wireless computing device 50 includes a display 54 and a memory 56 that may contain, for example, business performance metric quantifier alert data 58. The business performance metric quantifier alert data 58 may identify desirable values, or ranges, for business performance metric quantifiers received from the BSCD 12-1. In some embodiments, the wireless computing device 50 may provide a user interface via the display 54 to enable the individual 18-N to set the desirable values, or ranges, in the business performance metric quantifier alert data 58.

The wireless computing device 50 receives, from the BSCD 12-1, a business performance metric quantifier that quantifies a business performance metric of the individual 18-N. The wireless computing device 50 determines that the business performance metric quantifier is an undesirable value. For example, the wireless computing device 50 may access the business performance metric quantifier alert data 58 and determine that the business performance metric quantifier is an undesirable value based on the business performance metric quantifier alert data 58. The wireless computing device 50 generates a business performance metric alert. The wireless computing device 50 includes one or more communications interfaces 60 via which the wireless computing device 50 can communicate with the BSCD 12-1 and the wearable computing device 38-1. In one embodiment, the wireless computing device 50 communicates with the wearable computing device 38-1 via a personal area network 62.

The wireless computing device 50 communicates the business performance metric alert to the wearable computing device 38-1 via the wireless communications interface 60. The wearable computing device 38-1 monitors a personal performance activity of the individual 18-N. The wearable computing device 38-1 receives, via the communications interface 44, the business performance metric alert from the wireless computing device 50 and signals the individual 18-N that the wearable computing device has received the business performance metric alert.

Figure 6:
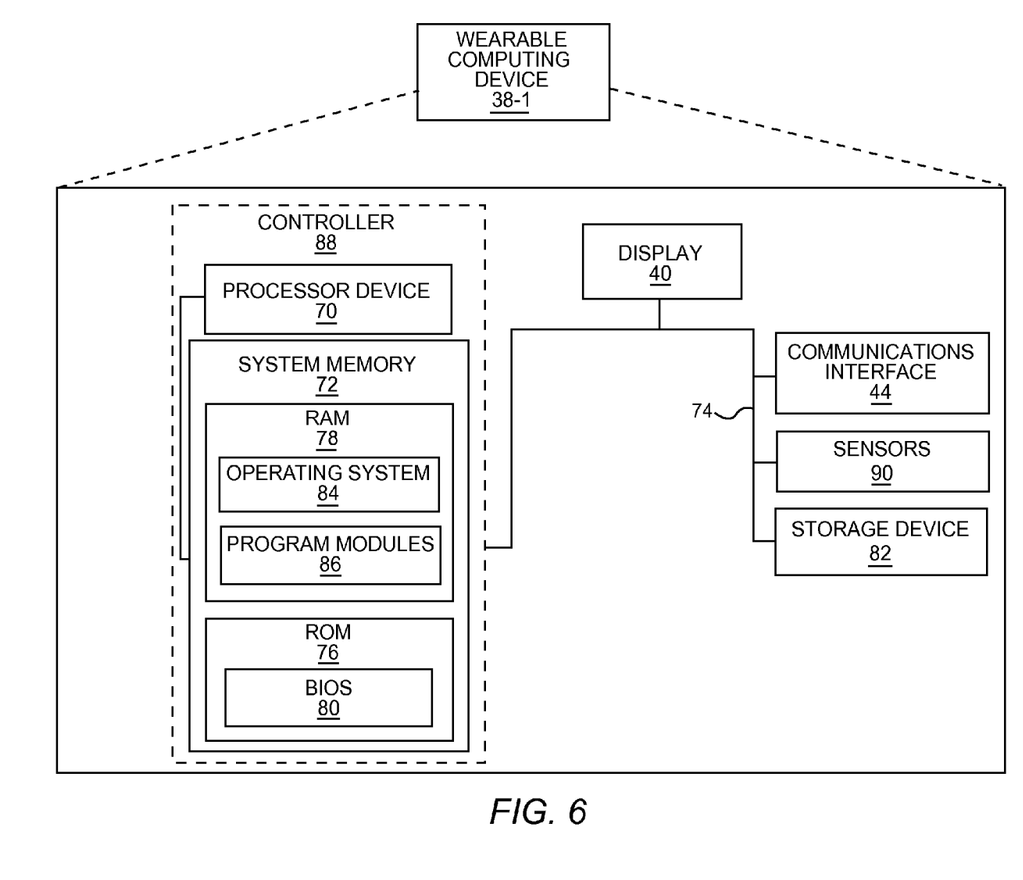
FIG. 6 is a bock diagram of a wearable computing device according to one embodiment.

FIG. 6 is a block diagram of the wearable computing device 38-1 according to one embodiment. The wearable computing device 38 may be substantially similar. The wearable computing device 38-1 may comprise any computing or processing device capable of including firmware, hardware, and/or executing software instructions to implement the functionality described herein, and which is capable of being worn by a user, such as the individual 18-N. The wearable computing device 38-1 includes a processor device 70, a system memory 72, and a system bus 74. The system bus 74 provides an interface for system components including, but not limited to, the system memory 72 and the processor device 70. The processor device 70 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The system memory 72 may include non-volatile memory 76 (e.g., read only memory (ROM), erasable programmable read-only memory (EPROM), electrically erasable programmable read-only memory (EEPROM), etc.) and/or volatile memory 78 (e.g., random-access memory (RAM)). A basic input/output system (BIOS) 80 may be stored in the non-volatile memory 76 and can include the basic routines that help to transfer information between elements within the wearable computing device 38-1.

The wearable computing device 38-1 may further include a computer-readable storage device 82, which may comprise, for example, internal solid state memory, or the like. The computer-readable storage device 82 may provide non-volatile storage of data, data structures, computer-executable instructions, and the like.

A number of modules can be stored in the computer-readable storage device 82 and in the volatile memory 78, including an operating system 84 and one or more program modules 86, which may implement the functionality described herein in whole or in part.

All or a portion of the embodiments may be implemented as a computer program product stored on a transitory or non-transitory computer-usable or computer-readable storage medium, such as the computer-readable storage 82, which includes complex programming instructions, such as complex computer-readable program code, configured to cause the processor device 70 to carry out the steps described herein. Thus, the computer-readable program code can comprise software instructions for implementing the functionality of the embodiments described herein when executed on the processor device 70. The processor device 70, in conjunction with the program modules 86 in the volatile memory 78, may serve as a controller 88 for the wearable computing device 38-1 that is configured to, or adapted to, implement the functionality described herein.

The wearable computing device 38-1 also includes the communications interface 44 and the display 40 for presentation of information, as discussed above. The wearable computing device 38-1 may include one or more sensors 90 configured to sense personal performance activities of the individual 18-N, such as the heart rate, blood pressure, or number of steps taken by the individual 18-N.

Figure 7:
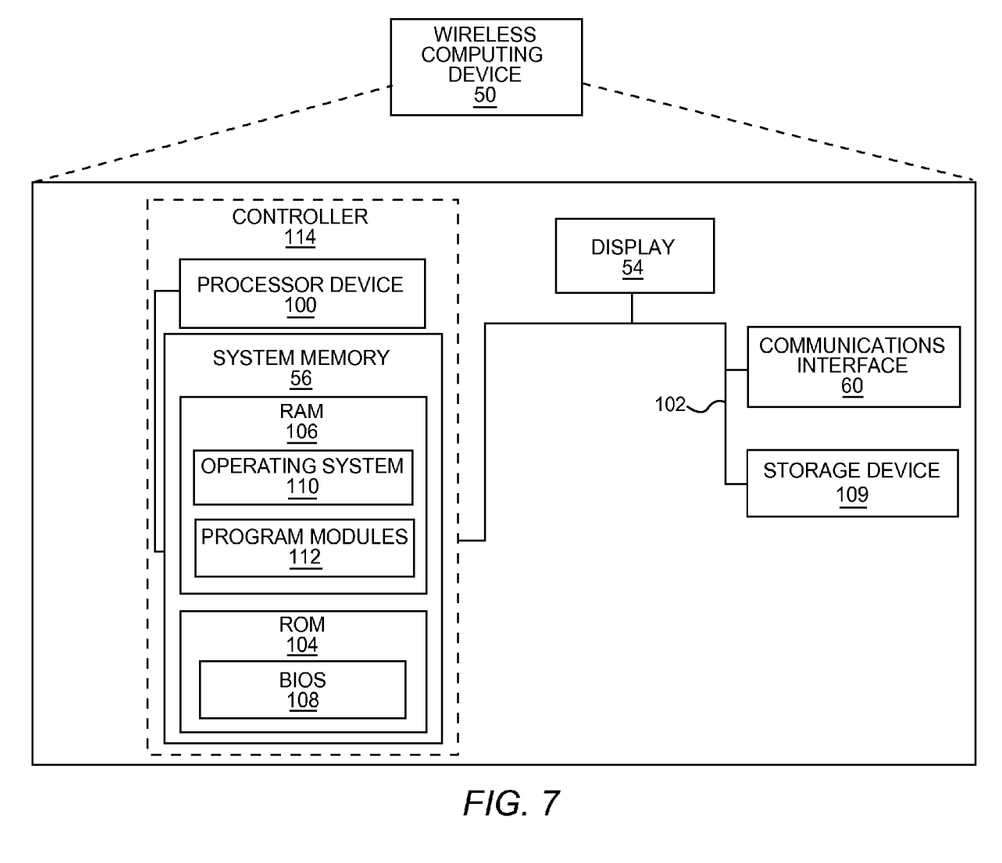
FIG. 7 is a block diagram of a wireless computing device according to one embodiment.

FIG. 7 is a bock diagram of the wireless computing device 50 according to one embodiment. The wireless computing device 50 may comprise any computing or processing device capable of including firmware, hardware, and/or executing software instructions to implement the functionality described herein, such as, by way of non-limiting example, a smart phone, a laptop or desktop computer, a computing tablet, and the like. The wireless computing device 50 includes a processor device 100, a system memory 56, and a system bus 102. The system bus 102 provides an interface for system components including, but not limited to, the system memory 56 and the processor device 100. The processor device 100 can be any commercially available or proprietary processor.

The system bus 102 may be any of several types of bus structures that may further interconnect to a memory bus (with or without a memory controller), a peripheral bus, and/or a local bus using any of a variety of commercially available bus architectures. The system memory 56 may include non-volatile memory 104 (e.g., read-only memory (ROM), erasable programmable read-only memory (EPROM), electrically erasable programmable read-only memory (EEPROM), etc.) and/or volatile memory 106 (e.g., random-access memory (RAM)). A basic input/output system (BIOS) 108 may be stored in the non-volatile memory 104 and can include the basic routines that help to transfer information between elements within the wireless computing device 50.

The wireless computing device 50 may further include a computer-readable storage device 109, which may comprise, for example, internal solid state memory, or the like. The computer-readable storage device 109 may provide non-volatile storage of data, data structures, computer-executable instructions, and the like.

A number of modules can be stored in the computer-readable storage device 109 and in the volatile memory 106, including an operating system 110 and one or more program modules 112, which may implement the functionality described herein in whole or in part.

All or a portion of the embodiments may be implemented as a computer program product stored on a transitory or non-transitory computer-usable or computer-readable storage medium, such as the computer-readable storage device 109, which includes complex programming instructions, such as complex computer-readable program code, configured to cause the processor device 100 to carry out the steps described herein. Thus, the computer-readable program code can comprise software instructions for implementing the functionality of the embodiments described herein when executed on the processor device 100. The processor device 100, in conjunction with the program modules 112 in the volatile memory 106, may serve as a controller 114 for the wireless computing device 50 that is configured to, or adapted to, implement the functionality described herein.

The wireless computing device 50 also includes the communications interface 60 and the display 54 for presentation of information, as discussed above.

Those skilled in the art will recognize improvements and modifications to the preferred embodiments of the disclosure. All such improvements and modifications are considered within the scope of the concepts disclosed herein and the claims that follow.

What is claimed is:

1. A wearable computing device, comprising:
a wireless communications interface;
a display;
a processor device coupled to the wireless communications interface, the processor device configured to:
monitor a personal performance activity of a wearer of the wearable computing device;
provide a first visual depiction on the display that quantifies the personal performance activity of the wearer;
receive, via the wireless communications interface, a business performance metric quantifier that quantifies a business performance metric of an individual or group of individuals and wherein the individual or the group of individuals is different from the wearer of the wearable computing device:
determine a minimum value and a maximum value associated with the business performance metric quantifier, wherein the minimum value and the maximum value delineate an undesirable range of values;
determine that the business performance metric quantifier is within the undesirable range of values; and
based on the determination that the business performance quantifier is within the undesirable range of values:
generate a business performance metric alert; and
signal, via the display, the wearer that the wearable computing device has generated the business performance metric alert.

2. The wearable computing device of claim 1, wherein the personal performance activity of the wearer is an aggregate number of steps taken over a period of time.

3. The wearable computing device of claim 1, wherein the processor device is further configured to provide a second visual depiction on the display that identifies the business performance metric alert.

4. The wearable computing device of claim 1, wherein the wearable computing device comprises a light-generating device, and wherein to signal the wearer that the wearable computing device has received the business performance metric alert the processor device is further configured to initiate activation of the light-generating device.

5. The wearable computing device of claim 1, wherein the wearable computing device comprises a wrist strap, and wherein the wrist strap is configured to fix the wearable computing device with respect to a wrist of the wearer.

6. The wearable computing device of claim 1, wherein: to signal the wearer that the wearable computing device has received the business performance metric alert, the processor device is further configured to present, on the display, the business performance metric quantifier.

7. The wearable computing device of claim 1, wherein the business performance metric comprises an answered calls count performance metric, a wait time for incoming callers performance metric, an abandoned call count performance metric, a revenue per agent performance metric, a customer satisfaction performance metric, and a first call resolution per service performance metric.

8. The wearable computing device of claim 1, wherein the wearer comprises the individual.

9. A system, comprising: a wireless computing device, comprising:
a first wireless communications interface configured to communicate with a network;
a first processor device coupled to the first wireless communications interface and programmed to:
receive a business performance metric quantifier that quantifies a business performance metric of an individual or group of individuals:
determine a minimum value and a maximum value associated with the business performance metric quantifier, wherein the minimum value and the maximum value delineate an undesirable range of values;
determine that the business performance metric quantifier is within the undesirable range of values;
based on the determination that the business performance quantifier is within the undesirable range of values:
generate a business performance metric alert; and
communicate the business performance metric alert to a wearable computing device via the first wireless communications interface; and the wearable computing device, further comprising:
a second wireless communications interface configured to communicate with the network;
a second processor device coupled to the second wireless communications interface, the second processor device programmed to:
monitor a personal performance activity of a wearer of the wearable computing device, wherein the wearer of the wearable computing device is different from the individual or group of individuals for which the business performance is quantified by the business performance metric quantifier;
provide a first visual depiction on a display of the wearable computing device that quantifies the personal performance activity of the wearer;
receive, via the second wireless communications interface, the business performance metric alert; and
signal, via the display, the wearer that the wearable computing device has received the business performance metric alert.

10. The system of claim 9, wherein the personal performance activity of the wearer is an aggregate number of steps taken over a period of time.

11. The system of claim 9, wherein the second processor device is further configured to provide a second visual depiction on the display that identifies the business performance metric alert.

12. The system of claim 9, wherein the wearable computing device comprises a light-generating device, and wherein to signal the wearer that the wearable computing device has received the business performance metric alert the second processor device is further configured to initiate activation of the light-generating device.

13. The system of claim 9, wherein the wearable computing device comprises a wrist strap, and wherein the wrist strap is configured to fix the wearable computing device with respect to a wrist of the wearer.

14. The system of claim 9, wherein the wearable computing device comprises a display, and wherein to signal the wearer that the wearable computing device has received the business performance metric alert the second processor device is further configured to present, on the display, the business performance metric quantifier.

15. The system of claim 9, wherein the business performance metric comprises an answered calls count performance metric, a wait time for incoming callers performance metric, an abandoned call count performance metric, a revenue per agent performance metric, a customer satisfaction performance metric, and a first call resolution per service performance metric.

16. The system of claim 9, wherein to determine that the business performance metric quantifier is the undesirable value, the first processor device is further configured to:

access business performance metric information that identifies a plurality of different business performance metrics and corresponding business performance metric undesirable values; and
determine, based on the business performance metric information, that the business performance metric quantifier is the undesirable value.

17. A method for signaling a wearer of a wearable computing device, comprising:
monitoring, by a wearable computing device comprising a processor device, a personal performance activity of the wearer;
providing a first visual depiction on a display of the wearable computing device that quantifies the personal activity of the wearer;
receiving, via a wireless communications interface, a business performance metric quantifier that quantifies a business performance metric of an individual or group of individuals and wherein the individual or the group of individuals is different from the wearer of the wearable computing device;
determining, by the processor device, a minimum value and a maximum value associated with the business performance metric quantifier, wherein the minimum value and the maximum value delineate an undesirable range of values;
determining, by the processor device, that the business performance metric is within the undesirable range of values;
based on the determination that the business performance quantifier is within the undesirable range of values:
generating a business performance metric alert that indicates that the business performance metric quantifier is within the undesirable range of values; and
signaling, via the display, the wearer that the wearable computing device has generated the business performance metric alert.

18. The method of claim 17, wherein the personal performance activity of the wearer is an aggregate number of steps taken over a period of time.

19. The method of claim 17, wherein the processor device is further configured to provide a second visual depiction on the display that identifies the business performance metric alert.

20. The method of claim 17, wherein signaling the wearer that the wearable computing device has received the business performance metric alert comprises the processor device presenting, on the display, the business performance metric quantifier.

* * * * *